United States Patent Office 2,843,562
Patented July 15, 1958

2,843,562

CROSS-LINKED GRAFT COPOLYMERS OF VINYL CHLORIDE AND POLYVINYL ALCOHOLS AND PROCESS FOR PREPARING SAME

John R. Caldwell, Kingsport, Tenn., assignor to Eastman Kodak Company, Rochester, N. Y., a corporation of New Jersey No Drawing. Application May 29, 1956
Serial No. 587,962

10 Claims. (Cl. 260—45.5)

This invention relates to resinous graft type copolymers prepared by polymerizing vinyl chloride, or a mixture thereof with a much lesser amount of a different polymerizable monomer containing but a single olefinic unsaturation, with a cross-linking monomeric agent containing at least two olefinic unsaturations, in the presence of a preformed vinyl alcohol polymer.

It is known that vinyl chloride can be polymerized in the presence of polyvinyl alcohol to give graft copolymers which combine the properties of both polyvinyl chloride and polyvinyl alcohol in modified forms. However, films and fibers prepared by such prior art processes have the serious disadvantage that they are unstable in hot or boiling water. In some cases, such products become completely disintegrated in boiling water. Attempts to improve the stability by insolubilization of the polyvinyl alcohol units have been made, for example, by incorporation into the compositions of hardening agents such as salts, acids, formaldehyde, etc., but these methods involve chemical reactions that consume hydroxyl groups and change the fundamental properties of the polymers. Furthermore, the previously known methods introduce elements into the polymeric compositions that are especially harmful where such modified polymers are in photographic processes.

I have now found that graft copolymers of vinyl chloride and polyvinyl alcohol and related vinyl alcohol polymers can be modified by a wholly different process so that all of the advantages of these components in combination are retained, without introducing any of the above-mentioned serious drawbacks inherent in the prior art processes, by the use of cross-linking agents such as divinylbenzene which are believed to cross-link with the vinyl chloride-polyvinyl alcohol chains through the vinyl chloride units. Thus, my new graft copolymers contain the polyvinyl alcohol in substantially unaltered form in a graft type of combination and thereby retain the valuable properties of this component with respect to dye absorption, flexibility, permeability to aqueous salt solutions, ability to orient and crystallize when drafted, etc. They are also characterized by improved resistance to burning. Another important property is that they can be coated or spun to good quality films or fibers from their aqueous or common solvent dispersions or emulsions. This is an important and unexpected discovery, because it is well known that polyvinyl chloride is insoluble in common solvents such as ketones, alcohols and ethers. Thus, the polymerizations may be carried out in water or in such common solvents as those mentioned above, and the reaction mixtures can be employed directly without recourse to the conventional steps of isolation, dissolution in special solvents, followed by spinning or casting shaped articles from these solutions. In addition, my new graft copolymers are outstanding in their stability to boiling water, films and fibers thereof showing no signs of disintegration by this treatment.

It is, accordingly, an object of the invention to provide a new class of insolubilized vinyl chloride-polyvinyl alcohol and related graft copolymers. Another object is to provide superior films and fibers from these copolymers. Another object is to provide a process for preparing the same. Other objects will become apparent hereinafter.

In accordance with the invention, I prepare my new graft copolymers by polymerizing a mixture comprising (1) from 15 to 90%, but preferably from 40 to 85% by weight of vinyl chloride or a mixture that is predominantly vinyl chloride but containing up to 25% of its weight of another polymerizable comonomer having but a single olefinic unsaturation represented by a $CH_2=C<$ group (vinylidene group), (2) from 85 to 10% by weight of polyvinyl alcohol or a vinyl alcohol copolymer containing up to 50 mole percent of a different vinylidene compound and (3) from 0.1 to 5%, based on the weight of the vinyl chloride, of a cross-linking agent such as divinylbenzene, etc.

The preferred comonomers that can be employed with the vinyl chloride are vinyl esters of saturated aliphatic carboxylic acids containing from 1 to 4 carbon atoms such as vinyl acetate vinyl propionate, vinyl butyrate, etc., but other comonomers also give valuable results such as the isopropenyl esters represented by isopropenyl acetate, isopropenyl propionate, etc., vinyl benzoate, acrylamide, N-alkyl and N,N-dialkyl acrylamides and corresponding methacrylamides, and similar vinylidene compounds. Suitable vinyl alcohol polymers include polyvinyl alcohol, partially hydrolyzed polyvinyl esters and partially or completely hydrolyzed copolymers of vinyl esters with comonomers such as isopropenyl esters, e. g. isopropenyl acetate, alkyl acrylates and methacrylates e. g. methyl acrylate, methyl methacrylate, etc., acrylamides e. g. acrylamide, methacrylamide, N-methyl acrylamide, N,N-dimethylacrylamide, etc. The hydrolysis products of polyvinyl acetate and vinyl acetate copolymers are preferred. Where the polyvinyl ester is only partially hydrolyzed, the extent of hydrolysis or conversion of vinyl ester units to vinyl alcohol units is set forth as a percentage. In any case, the vinyl alcohol polymer employed contains at least 50 mole percent of vinyl alcohol units in the molecule. Suitable cross-linking agents include divinylbenzene, diallyl phthalate, allyl acrylate, triallyl cyanurate, ethylene glycol diacrylate, and the like.

The polymerizations for preparing the graft copolymers of the invention may be carried out in mass, but preferably in an inert liquid reaction such as water, in the presence of a polymerization catalyst, actinic light or heat. However, other inert reaction mediums such as alcohols, dioxane, acetone, etc. or mixtures of these solvents with water are also operable. Suitable polymerization catalysts include peroxides such as benzoyl peroxide, acetyl peroxide, lauroyl peroxide, di-ter.-butyl peroxide, hydrogen peroxide, sodium or potassium persulfates, sodium or potassium perborates, etc. Azo-bis-isobutyronitrile may also be employed as a catalyst. The amount of catalyst used can vary from about 0.1 to 3.0%, based on the weight of the monomer to be polymerized. The temperature can vary over a wide range, but preferably the polymerizations are carried out at from about 30°–100° C. When carried out in a water medium, an activating agent such as an alkali metal bisulfite e. g. sodium or potassium bisulfite may advantageously be employed. Also, it is advantageous in aqueous systems to employ surface active agents such as fatty alcohol sulfates e. g. sodium or potassium cetyl sulfate, sodium or potassium lauryl sulfate, etc., aromatic sulfonates e. g. sodium or potassium salts of alkylnaphthalene sulfonic acids, sulfonated oils, and the like. These surface active agents may be employed up to about 3–5% of the weight of the components to be graft copolymerized. In general, the graft copolymers contain the components in about the same proportions as they were present in the starting polymerization mixtures. No unreacted monomers are present in the polymerized compositions.

The following examples will serve to illustrate further my new graft copolymers and the manner of their preparations and uses.

*Example 1*

A mixture of 50 g. of polyvinyl alcohol (95–100% hydrolyzed polyvinyl acetate), 50 g. of vinyl chloride, 1.0 g. of divinylbenzene, 1.0 g. of sodium octadecyl sulfate, 0.5 g. of potassium persulfate, 0.4 g. of sodium bisulfite and 300 cc. of water was placed into a capped bottle and tumbled in a water bath at 40° C. for 36 hours. The resulting emulsion contained in a graft copolymer combination approximately 49.5% of polyvinyl alcohol, 49.5% of vinyl chloride and 1% of divinylbenzene. No unreacted monomers were present in the emulsion. The emulsion was extruded into a coagulating bath of sodium sulfate solution. After washing, the fibers were drafted 400% in a heated chamber and then passed through an oven at 180°–190° C., while held under tension. The fibers had a dry tensile strength of 2.6 g./denier and a wet strength of 1.5 g./denier. They dyed well with direct cotton and vat dyes and retained their strength well in boiling water. The fibers were highly flame resistant. When the above example was repeated, except that the divinylbenzene was omitted, the resultant fibers had a wet strength of only 0.5 g./denier and disintegrated completely in boiling water.

In place of the divinylbenzene, there may be substituted a like amount of any of the other mentioned suitable cross-linking agents such as allyl acrylate, triallyl cyanurate, diallyl phthalate or ethylene glycol diacrylate to give generally similar graft copolymers of the invention.

*Example 2*

A mixture of 100 g. of polyvinyl alcohol (90–95% hydrolyzed polyvinyl acetate), 50 g. of vinyl chloride, 0.5 g. of allyl acrylate, 1.0 g. of sulfonated mineral oil, 0.4 g. of ammonium persulfate and 500 cc. of water was stirred at 60°–70° C. for 18 hours. An emulsion was obtained of the graft copolymer of the above polymerizable components. It was extruded through a spinneret into an aqueous acetone precipitating bath and the filaments were collected on a bobbin. The yarn was then drafted 500% at an elevated temperature and heated for 5 minutes at 180°–190° C., while held under tension. Strong, elastic fibers were obtained. The fibers showed good resistance to hot and boiling water. They dyed well with direct cotton and vat dyes. Fibers prepared as above, but from a mixture that did not contain allyl acrylate, disintegrated in boiling water.

*Example 3*

A mixture of 60 g. of polyvinyl alcohol (75% hydrolyzed polyvinyl acetate), 40 g. of vinyl chloride, 0.5 g. of divinylbenzene, 0.4 g. of acetyl peroxide, 240 g. of isopropyl alcohol and 60 cc. of water was stirred at 50° C. for 24 hours. The dispersion of the graft copolymer of the above polymerizable components was extruded through a spinneret into a hot air chamber. After drafting and heat-setting, the fibers were strong and elastic, flame resistant and stable to hot water. When the divinylbenzene was omitted from the above composition, the resulting fibers disintegrated in hot water.

*Example 4*

A. A mixture of 150 g. of polyvinyl alcohol (95–100% hydrolyzed polyvinyl acetate), 40 g. of vinyl chloride, 10 g. of vinyl acetate, 1.0 g. of diallyl phthalate, 0.8 g. of sodium dodecyl sulfate, 0.6 g. of sodium persulfate, 0.4 g. of sodium bisulfite and 1000 cc. of water was stirred at 45°–50° C. for 30 hours to give an emulsion of the graft copolymer of the above polymerizable components. Clear, hard films were obtained by coating the emulsion on glass plates and drying at 110°–120° C. Although these films were insoluble in water, they were permeable to salt solutions when immersed in water. They were found to be useful as gelatin substitutes in photography.

B. A stepwise process employing the above components was carried out for comparison purposes. In this example, a mixture of 40 g. of vinyl chloride, 10 g. of vinyl acetate, 1.0 g. of diallyl phthalate, 0.8 g. of sodium dodecyl sulfate, 0.6 g. of sodium persulfate, 0.4 g. of sodium bisulfite and 400 cc. of water was stirred at 45°–50° C. in an autoclave to give an emulsion of cross-linked polymer. The emulsion was then mixed with 150 g. of polyvinyl alcohol (95% hydrolyzed polyvinyl acetate) in 600 cc. of water and films coated from the mixture. After drying at 110°–120° C., the films were opaque and weak. They disintegrated completely after soaking in water at room temperature for several minutes. It will be noted that this composition has the same components in the same proportions as the one described above, except that it was made by a stepwise process in which the vinyl chloride, vinyl acetate and diallyl phthalate were polymerized in the absence of polyvinyl alcohol. Under these conditions, the graft copolymer complex of cross-linked resin and polyvinyl alcohol of the invention could not be formed. The great difference in solubility properties of the respective films shows that all three elements must be present simultaneously in the polymerization reaction to give the graft copolymers of the invention.

In place of the vinyl acetate in A of the above example, there may be substituted a like amount of acrylonitrile to give copolymers having generally similar properties and utilities. For example, these products are likewise useful as gelatin substitutes, but additionally they give strong, elastic and flame resistant fibers and films. The latter swell only slightly in water at 70°–80° C., but hold their shape well. In contrast thereto, when the cross-linking agent was omitted from the process, the resulting films disintegrated in water at 70°–80° C. Accordingly, the acrylonitrile containing graft copolymers of the invention are of particular value as gelatin substitutes in photographic films, permitting rapid processing at temperatures of 70°–80° C. without distortion of the image layer.

Other generally similar graft copolymers coming within the scope of the invention may be prepared by following the procedures of the above examples with any of the mentioned polymerizable components in the specified proportions and combinations. These products also show good dye absorptions and high resistance to hot or boiling water, and films and coatings thereof directly from their polymerization reaction mixtures, i. e. dispersions thereof, are clear and flexible, while the fibers thereof have the added ability to orient and crystallize when drafted. Some of these products are also permeable to aqueous salt solutions and, accordingly, are especially useful as gelatin substitutes in photographic processes. Thus, they can function as vehicles for silver halide salts and as materials for filter layers, antihalation layers, dye layers, separation layers etc. in photographic elements. While the examples have illustrated the process of the invention with only the very essential materials, it will be understood that limited amounts of inert materials such as dyes, pigments, plasticizers, etc. can be added to the polymerization reaction mixtures at any stage of polymerization and that these will give added effects and utility to the films, coatings and fibers produced directly from the polymerized reaction mixtures.

What I claim is:

1. A resinous graft copolymer of (1) from 25 to 49.5% by weight of a vinyl chloride member selected from the group consisting of (a) vinyl chloride and (b) a mixture consisting of at least 80% by weight vinyl chloride and the remainder of a vinyl ester of a saturated fatty acid of 1 to 4 carbon atoms, (2) from 74.7 to 49.5% by weight of a preformed polymer selected from the group consisting of polyvinyl alcohol and a partially hydrolyzed polyvinyl acetate wherein at least 75% of the vinyl acetate units have been converted to vinyl alcohol units, and (3) from 0.3 to 1% by weight of a cross-linking agent selected from the group consisting of divinylbenzene, diallyl phthalate, triallyl cyanurate, allyl acrylate and ethylene glycol diacrylate, and wherein the said vinyl chloride member and the said cross-linking agent are combined by addition polymerization with the said preformed polymer to give the said graft copolymer.

2. A process for preparing a resinous graft copolymer which comprises heating a mixture comprising a liquid reaction medium selected from the group consisting of water and a mixture of water and isopropyl alcohol, a peroxide polymerization catalyst, and as the sole polymerizable components (1) from 25 to 49.5% by weight of a vinyl chloride member selected from the group consisting of (a) vinyl chloride and (b) a mixture consisting of at least 80% by weight of vinyl chloride and the remainder of a vinyl ester of a saturated fatty acid of 1 to 4 carbon atoms, (2) from 74.7 to 49.5% by weight of a preformed polymer selected from the group consisting of polyvinyl alcohol and a partially hydrolyzed polyvinyl acetate wherein at least 75% of the vinyl acetate units have been converted to vinyl alcohol units, and (3) from 0.3 to 1% by weight of a cross-linking agent selected from the group consisting of divinylbenzene, diallyl phthalate, triallyl cyanurate, allyl acrylate and ethylene glycol diacrylate, whereby the said vinyl chloride member and the said cross-linking agent are combined by addition polymerization with the said preformed polymer to give the said graft copolymer.

3. The process for preparing a resinous graft copolymer according to the process of claim 2 wherein (1) is vinyl chloride, (2) is polyvinyl alcohol, and (3) is divinylbenzene.

4. The process for preparing a resinous graft copolymer according to the process of claim 2 wherein (1) is vinyl chloride, (2) is a partially hydrolyzed polyvinyl acetate wherein from 90 to 95% of the vinyl acetate units have been converted to vinyl alcohol units, and (3) is allyl acrylate.

5. The process for preparing a resinous graft copolymer according to the process of claim 2 wherein (1) is vinyl chloride, (2) is a partially hydrolyzed polyvinyl acetate wherein 75% of the vinyl acetate units have been converted to vinyl alcohol units, and (3) is divinylbenzene.

6. The process for preparing a resinous graft copolymer according to the process of claim 2 wherein (1) is a mixture consisting of at least 80% by weight of vinyl chloride and the remainder of vinyl acetate, (2) is a partially hydrolyzed polyvinyl acetate wherein 95% of the vinyl acetate units have been converted to vinyl alcohol units, and (3) is diallyl phthalate.

7. A resinous graft copolymer of (1) from 25 to 49.5% by weight of vinyl chloride, (2) from 74.7 to 49.5% by weight of preformed polyvinyl alcohol and (3) from 0.3 to 1% by weight of divinylbenzene, wherein the said vinyl chloride and the said divinylbenzene are combined by addition polymerization with the said preformed polyvinyl alcohol to give the said graft copolymer.

8. A resinous graft copolymer of (1) from 25 to 49.5% by weight of vinyl chloride, (2) from 74.7 to 49.5% by weight of a preformed partially hydrolyzed polyvinyl acetate wherein from 90 to 95% of the vinyl acetate units have been converted to vinyl alcohol units and (3) from 0.3 to 1% by weight of allyl acrylate, and wherein the said vinyl chloride and the said allyl acrylate are combined by addition polymerization with the said preformed partially hydrolyzed polyvinyl acetate to give the said graft copolymer.

9. A resinous graft copolymer of (1) from 25 to 49.5% by weight of vinyl chloride, (2) from 74.7 to 49.5% by weight of a preformed hydrolyzed polyvinyl acetate wherein 75% of the vinyl acetate units have been converted to vinyl alcohol units, and (3) from 0.3 to 1% by weight of divinylbenzene, and wherein the said vinyl chloride and the said divinylbenzene are combined by addition polymerization with the said preformed partially hydrolyzed polyvinyl acetate to give the said graft copolymer.

10. A resinous graft copolymer of (1) from 25 to 49.5% by weight of a mixture consisting of at least 80% by weight of vinyl chloride and the remainder of vinyl acetate, (2) from 74.7 to 49.5% by weight of a preformed partially hydrolyzed polyvinyl acetate wherein 95% of the vinyl acetate units have been converted to vinyl alcohol units, and (3) from 0.3 to 1% by weight of diallyl phthalate, and wherein the said mixture of vinyl chloride and vinyl acetate and the said diallyl phthalate are combined by addition polymerization with the said preformed partially hydrolyzed polyvinyl acetate to give the said graft copolymer.

References Cited in the file of this patent
UNITED STATES PATENTS

| | | |
|---|---|---|
| 2,202,846 | Garvey et al. | June 4, 1940 |
| 2,227,163 | Starck et al. | Dec. 31, 1940 |
| 2,279,436 | Berg | Apr. 14, 1942 |
| 2,712,536 | Winslow | July 5, 1955 |
| 2,719,142 | Dijk et al. | Sept. 27, 1955 |